United States Patent [19]

Mair et al.

[11] Patent Number: 5,094,767
[45] Date of Patent: Mar. 10, 1992

[54] HIGHLY VISCOUS MAGNETIC FLUIDS HAVING NONMAGNETIC PARTICLES

[75] Inventors: Gunther Mair, Mannheim; Rainer Feser, Gruenstadt, both of Fed. Rep. of Germany

[73] Assignee: BASF Aktiengesellschaft, Ludwigshafen, Fed. Rep. of Germany

[21] Appl. No.: 585,184

[22] Filed: Sep. 20, 1990

[51] Int. Cl.$^5$ ............................................. C01G 49/08
[52] U.S. Cl. ................................. 252/62.56; 252/62.52
[58] Field of Search ........................... 252/62.56, 62.52

[56] References Cited

U.S. PATENT DOCUMENTS

| | | | |
|---|---|---|---|
| 3,351,413 | 11/1967 | Kono . | |
| 3,843,540 | 10/1974 | Reimers et al. . | |
| 4,094,804 | 6/1978 | Shimoiizaka | 252/62.51 |
| 4,485,024 | 11/1984 | Furumura et al. | 252/62.56 |
| 4,810,401 | 3/1989 | Mair et al. | 252/62.56 |

FOREIGN PATENT DOCUMENTS

| | | |
|---|---|---|
| 249229 | 12/1987 | European Pat. Off. . |
| 0204566 | 11/1983 | Fed. Rep. of Germany ... 252/62.56 |

OTHER PUBLICATIONS

Patent Abstracts of Japan, vol. 13, No. 518 (1989).
Patent Abstracts of Japan, vol. 13, No. 437 (1989).

*Primary Examiner*—Prince Willis, Jr.
*Assistant Examiner*—Thomas Steinberg
*Attorney, Agent, or Firm*—Keil & Weinkauf

[57] ABSTRACT

Highly viscous magnetic fluids essentially consist of superparamagnetic solid particles coated with a surfactant and colloidally dispersed in a carrier liquid.

4 Claims, No Drawings

HIGHLY VISCOUS MAGNETIC FLUIDS HAVING NONMAGNETIC PARTICLES

The present invention relates to highly viscous magnetic fluids, essentially consisting of superparamagnetic solid particles coated with a surfactant and colloidally dispersed in a carrier liquid.

Magnetic fluids are highly stable colloidal suspensions of extremely finely divided ferromagnetic or ferrimagnetic materials, which have superparamagnetic behavior owing to their small particle size, in non-aqueous, polar or nonpolar liquids.

The preparation of such magnetic fluids is known. For example, U.S. Pat. No. 3,843,540 describes a process for the preparation of magnetic fluids from superparamagnetic solid particles and nonpolar liquid media, in which the particles are precipitated from aqueous metal salt solutions which correspond to the chemical composition of the particles by means of a base, are coated with surfactants, are transferred to nonpolar liquids, are flocculated in said liquids by means of acetone, are separated off and are washed with acetone and are then redispersed in a nonpolar liquid. U.S. Pat. No. 3,351,413 discloses that, in addition to cubic ferrites, magnetite and $\gamma$-$Fe_2O_3$ and any other solid magnetic material which can be comminuted in a suitable manner, cubic manganese zinc ferrites are in general also suitable for the preparation of superparamagnetic solid particles and magnetic fluids.

However, superparamagnetic ferrites of known composition have the disadvantage that their saturation magnetization $M_s$ is comparatively low. Accordingly, large amounts of ferrites have to be used in each case for the preparation of magnetic fluids having a high saturation magnetization $M_s$. Because they have to have a high solids content, the relevant magnetic fluids are then often unstable and therefore only of limited suitability for many intended uses. To improve the saturation magnetization, the incorporation of cobalt ions, nickel ions and/or manganese ions in the ferrite lattice has therefore been proposed (U.S. Pat. No. 4,810,401).

Magnetic fluids are used in sliding bearings and shaft seals and for damping movements, for example in stepping motors or in loudspeaker coils. In addition to conventional properties such as the saturation magnetization and the long-term stability to sedimentation, an adjustable viscosity is also required, in particular in a viscosity range which is higher than that which is usual in seal applications. It is known that the viscosity can be increased by choosing a more viscous carrier liquid. However, the disadvantage of this is a deterioration in the stability to sedimentation.

Furthermore, the viscosity increases with the content of superparamagnetic particles. However, this results in an increase in the saturation magnetization, which is not always desirable. In particular, however, the stability in a magnetic field decreases. The viscosity can also be increased by adding solid additives, such as carbon black. However, these fluids are no longer sufficiently stable, and the flow behavior usually assumes non-Newtonian characteristics, which is also undesirable.

It is an object of the present to provide a magnetic fluid which permits high kinematic viscosities to be obtained in a controlled manner without any change in the other properties, such as saturation magnetization and especially long-term stability.

We have found that this object is achieved by magnetic fluids, essentially consisting of superparamagnetic solid particles coated with a surfactant and colloidally dispersed in a carrier liquid, if the solid particles consist of a mixture of superparamagnetic particles having a saturation magnetization $M_s$ greater than 50 $nTm^3/g$ and of ferrite particles having a saturation magnetization $M_s$ less than 10 $nTm^3/g$.

In a particular embodiment of the novel magnetic fluids, the colloidally dispersed solid particles consist of superparamagnetic particles having a saturation magnetization $M_s$ of from greater than 60 to not more than 90 $nTm^3/g$ and ferrite particles, in particular zinc ferrite particles, having a saturation magnetization less than 5 $nTm^3/g$ and in particular of virtually nonmagnetic particles, each having a mean particle size of from 3 to 20 nm.

The superparamagnetic solid particles which are present in the novel magnetic fluids are known. The materials usually used are selected from the group consisting of the ferrites.

Cubic ferrites as disclosed in, for example, U.S. Pat. No. 4,810,401, in particular the superparamagnetic cubic cobalt manganese zinc iron ferrites, the cubic nickel manganese zinc iron ferrites and the manganese zinc iron ferrites, are particularly preferred. The particle size of these ferrite particles corresponds to a BET specific surface area of from 40 to 130, preferably from 50 to 120, in particular from 60 to 110 $g/m^2$. In a magnetic field having a strength of 160 kA/m, they have a saturation magnetization $M_s$ greater than 50, in particular from greater than 60 to not more than 90, $nTm^3/g$.

In addition to the superparamagnetic solid particles, the novel magnetic fluids also contain the ferrite particles which are only weakly magnetic or virtually nonmagnetic. Zinc-containing cubic ferrites and in particular zinc ferrites having an $M_s$ less than 5 $nTm^3/g$ are suitable for this purpose. They can be prepared, for example, in the same manner as described for the solid particles in U.S. Pat. No. 4,810,401.

For the novel magnetic fluids, the stated mixture of the two types of solid particles is used in order to obtain the high kinematic viscosity coupled with constant saturation magnetization and in particular high long-term stability. The proportion of the ferrite solid particles which are only weakly magnetic or virtually nonmagnetic depends on the viscosity required for the magnetic fluid and on the nature of the other components. However, it should be not less than 1% by weight, based on the total amount of solid particles, amounts of from 20 to 70% by weight being particularly advantageous.

The preparation of the magnetic fluids is generally known and the same methods may also be used for the preparation of the novel magnetic fluids. A particularly advantageous method is disclosed in U.S. Pat. No. 4,810,401. Here, the use of a carrier liquid containing a polymeric component, for example of a polyisobutylene or of a polyester having a molecular weight greater than 500, has proven suitable.

The novel magnetic fluids have a high kinematic viscosity which is not less than 500 $mm^2/s$ (at 20° C.), the nevertheless high long-term stability being particularly important.

The Examples which follow illustrate the invention and compare it with the prior art experiments.

EXAMPLES 1 TO 3

A mixture of manganese zinc ferrite having a saturation magnetization of 60 $nTm^3/g$ and zinc ferrite having the composition $ZnFe_2O_4$ and a saturation magnetization of 3 $nTm^3/g$, each having a mean particle size of from 7 to 12 nm, was suspended in water. A solution of sodium oleate in water was added to this suspension, the amount of sodium oleate having been chosen so that it was at least sufficient for coating the solid particles. Not less than the same number of parts by volume of petroleum ether as the number of parts by volume of aqueous medium present were also added to this dispersion of coated solid particles in the aqueous medium. The resulting mixture of two liquid phases was thoroughly mixed, the surfactant-coated solid particles being transferred to the petroleum ether. The mixture was then allowed to stand until the two liquid phases had completely separated again. The solid-rich aqueous medium was then separated off and discarded. The coated solid particles were then flocculated twice in their dispersions in petroleum ether by the addition of not less than the same number of parts by volume of methanol as the number of parts by volume of petroleum ether present, and were redispersed in the same number of parts by volume of fresh petroleum ether each time after the petroleum ether/methanol medium had been separated off. Thereafter, the higher boiling nonpolar liquids were added and the petroleum ether was distilled off.

The starting materials used and their amounts by weight are shown in the Table.

The kinematic viscosity V [$mm^2/s$] of the resulting magnetic fluids was determined according to Uebbelohde. In addition, the saturation magnetization $M_s$ [mT] in an external magnetic field of 160 kA/m was measured. The long-term stability LST was determined as described below.

The magnetic fluid was stored for 7 days at room temperature in an inhomogeneous magnetic field varying from 0 to 40 kA/m. Thereafter, the sedimentation was determined and was stated on the basis of a scale of marks: Mark 1=0-5%, Mark 2=6-10%, Mark 3=11-30% and Mark 4=>30% sedimentation.

The results of the measurements are shown in the Table.

COMPARATIVE EXPERIMENTS 1 TO 5

The procedure described in Examples 1 to 3 was followed, except that no zinc ferrite was used. The starting materials, their amounts and the results obtained in the measurements are shown in the Table.

TABLE

|  | Parts by weight Manganese zinc ferrite/zinc ferrite | Carrier liquid* Parts by weight | V [$mm^2/s$] | $M_s$ [$nTm^3/g$] | LST |
|---|---|---|---|---|---|
| Example 1 | 70/60 | 50 A/50 B | 8530 | 28 | 1 |
| Example 2 | 50/40 | 98 C/2 D | 940 | 23 | 2 |
| Example 3 | 50/40 | 100 C/— | 700 | 23 | 2 |
| Comp. Expt. 1 | 80/— | 10 A/90 B | 2800 | 33 | 3 |
| Comp. Expt. 2 | 70/— | —/100 B | 1760 | 27 | 4 |
| Comp. Expt. 3 | 110/— | 100 A/— | 600 | 36 | 3 |
| Comp. Expt. 4 | 110/— | 98 C/2 D | 1350 | 36 | 3 |
| Comp. Expt. 5 | 70/— | 95 C/5 D | 710 | 30 | 4 |

*A: Ester oil (Reproxal from Texaco)
B: Polyester oil (Reoplex GL from Ciba-Geigy)
C: Hydrocarbon oil (Progiline from Rhone-Poulenc)
D: Polyhydrocarbon (Oppanol B 3 from BASF)

We claim:

1. In a magnetic fluid consisting essentially of superparamagnetic solid particles coated with a surfactant and colloidally dispersed in a carrier liquid, the improvement comprising (1) the solid particles consist of a mixture of superparamagnetic particles having a saturation magnetization, $M_s$, greater than 50 $nTm^3/g$ and of virtually nonmagnetic ferrite particles having a saturation magnetization, $M_s$, less than 10 $nTm^3/g$, (2) the solid particles each having a mean particle size of from 3 to 20 nm, and (3) the magnetic fluid has a kinematic viscosity which is not less than 500 $mm^2/s$ (at 20° C.).

2. A magnetic fluid as claimed in claim 1, wherein the solid particles consist of superparamagnetic particles having a saturation magnetization $M_s$ of from greater than 60 to not more than 90 $nTm^3/g$ and ferrite particles having a saturation magnetization less than 5 $nTm^3/g$, each having a mean particle size of from 3 to 20 nm.

3. A magnetic fluid as claimed in claim 2, wherein the ferrite particles are zinc ferrite of the formula $ZnFe_2O_4$.

4. A magnetic fluid consisting essentially of superparamagnetic solid particles coated with a surfactant and colloidally dispersed in a carrier liquid, wherein the solid particles consist of a mixture of superparamagnetic particles having a saturation magnetization, $M_s$, greater than 50 $nTm^3/g$ and of virtually nonmagnetic ferrite particles having a saturation magnetization, $M_s$, less than 10 $nTm^3/g$, (2) the solid particles each having a mean particle size of from 3 to 20 nm, (3) the magnetic fluid has a kinematic viscosity which is not less than 500 $mm^2/s$ (at 20° C.), and (4) the carrier liquid contains a polymeric component having a molecular weight greater than 500.

* * * * *

UNITED STATES PATENT AND TRADEMARK OFFICE
CERTIFICATE OF CORRECTION

PATENT NO. : 5,094,767

DATED : March 10, 1992

INVENTOR(S) : Mair, et. al.

It is certified that error appears in the above-indentified patent and that said Letters Patent is hereby corrected as shown below:

On the Title page, under FOREIGN APPLICATION PRIORITY DATA -- insert Oct. 5, 1989 [DE].....Fed Rep. of Germany.....3933210--.

Signed and Sealed this

Seventh Day of September, 1993

Attest:

BRUCE LEHMAN

*Attesting Officer*  *Commissioner of Patents and Trademarks*